(12) United States Patent
Das et al.

(10) Patent No.: US 12,103,521 B2
(45) Date of Patent: Oct. 1, 2024

(54) SYSTEM AND METHOD FOR AUTOMATIC EMERGENCY BRAKING

(71) Applicant: KPIT TECHNOLOGIES LIMITED, Pune (IN)

(72) Inventors: Soumyo Das, Pune (IN); Prashantkumar Bipinchandra Vora, Pune (IN); Rastri Dey, Pune (IN); Kishan Kumar, Pune (IN); Milankumar Ambalal Sheta, Pune (IN); Meer Reshma Sheerin, Pune (IN)

(73) Assignee: KPIT TECHNOLOGIES LIMITED, Pune (IN)

( * ) Notice: Subject to any disclaimer, the term of this patent is extended or adjusted under 35 U.S.C. 154(b) by 394 days.

(21) Appl. No.: 17/617,225

(22) PCT Filed: Aug. 2, 2019

(86) PCT No.: PCT/IB2019/056602
§ 371 (c)(1),
(2) Date: Dec. 7, 2021

(87) PCT Pub. No.: WO2020/250019
PCT Pub. Date: Dec. 17, 2020

(65) Prior Publication Data
US 2022/0234578 A1    Jul. 28, 2022

(30) Foreign Application Priority Data
Jun. 14, 2019 (IN) .......................... 2019210237598

(51) Int. Cl.
B60W 30/09    (2012.01)
B60W 30/095   (2012.01)

(52) U.S. Cl.
CPC ........ *B60W 30/09* (2013.01); *B60W 30/0953* (2013.01); *B60W 30/0956* (2013.01);
(Continued)

(58) Field of Classification Search
CPC .. B60W 30/08; B60W 30/09; B60W 30/0953; B60W 30/0956;
(Continued)

(56) References Cited

U.S. PATENT DOCUMENTS 9,390,624 B2    7/2016  Minemura et al.
9,925,980 B2 *  3/2018  Edo-Ros ............... B60W 30/09
(Continued)

OTHER PUBLICATIONS

Das, et al., International Search Report, PCT/IB2019/056602, Feb. 13, 2020, 3 pages.
(Continued)

*Primary Examiner* — Calvin Cheung
(74) *Attorney, Agent, or Firm* — Rahman LLC

(57) ABSTRACT

The pedestrian tracking system implemented in a host vehicle is disclosed. The system estimates trajectories of the host vehicle and the pedestrian based on factors of position and velocity of the host vehicle and parameters of position and velocity of the pedestrian. The trajectories of the host vehicle and the pedestrian are estimated to estimate a point of intersection of the host vehicle and the pedestrian. Further, the system estimates time to collision based on the estimated point of intersection and determines trajectory of the pedestrian in path of the host vehicle. Furthermore, the system assesses collision risk to select the pedestrian as a target and generates a deceleration actuation command to decelerate the host vehicle based on the selected target, which is provided to an automatic emergency braking (AEB) actuation unit.

18 Claims, 8 Drawing Sheets

(52) U.S. Cl.
CPC ............... *B60W 2420/403* (2013.01); *B60W 2510/0638* (2013.01); *B60W 2510/18* (2013.01); *B60W 2520/12* (2013.01); *B60W 2554/4029* (2020.02)

(58) Field of Classification Search
CPC ... B60W 2420/403; B60W 2510/0638; B60W 2510/18; B60W 2520/12; B60W 2554/4029; B60W 2554/80; B60W 30/095; B60W 60/00; G06V 20/58; G08G 1/166
See application file for complete search history.

(56) References Cited

U.S. PATENT DOCUMENTS

| | | |
|---|---|---|
| 10,351,128 B2 * | 7/2019 | Sung ............... G08G 1/165 |
| 2016/0075332 A1 | 3/2016 | Edo-Ros |
| 2016/0272172 A1 | 9/2016 | Lee |

OTHER PUBLICATIONS

Das, et al., Written Opinion PCT/IB2019/056602, Feb. 13, 2020, 5 pages.

* cited by examiner

SYSTEM AND METHOD FOR AUTOMATIC EMERGENCY BRAKING

FIELD OF DISCLOSURE

The present disclosure relates to the field of vehicle automation. More particularly, the present disclosure relates to system and method for decelerating a host vehicle based on tracking of a pedestrian.

BACKGROUND OF THE DISCLOSURE

Pedestrians are vulnerable participants in a transportation system when accidents happen. With increase in the number of pedestrian fatalities on roads, significance and importance of techniques for detecting and tracking pedestrians are increasing. Pedestrian detection and tracking systems play a vital role in avoiding accidents by alerting the driver well in advance and are often integrated with Advanced Driver Assistance Systems (ADAS) and Automatic Emergency Braking (AEB) Systems in automobiles to prevent accidents on roads.

Detecting pedestrian(s) is a challenging task in the field of object detection. Sensors play an important role when it comes to detecting obstacles in surroundings. Commonly used sensors for the vehicles are LIDAR (Light Detection and Ranging), RADAR (Radio Detection and Ranging), ultrasound and camera. As compared to other sensors, vision-based systems are gaining significant importance due to their lower cost and advantages as compared to other sensors.

Existing vision-based methods of pedestrian detection and tracking, generally, face uncertainty of pedestrian tracking by high velocity maneuvering vehicle while confiscating the probability of external clutter. Further, situation-based evaluation strategy is required for minimization of false positives using probabilistic approach. Furthermore, existing methods face uncertainty and computation burden in assessing vast amount of track management information and vehicle state information from camera sensor.

There is therefore need in the art for system and method that can provide deceleration of a vehicle based on tracking of a pedestrian, which overcomes above-mentioned and other limitations of existing approaches.

OBJECTS OF THE INVENTION

Some of the objects of the present disclosure, which at least one embodiment herein satisfies are as listed herein below.

It is an object of the present disclosure to provide a system and method for decelerating a host vehicle based on tracking of a pedestrian.

It is an object of the present disclosure to provide a system and method for decelerating a host vehicle based on tracking of a pedestrian that provides appropriate collision avoidance or mitigation.

It is yet another object of the present disclosure to provide a system and method for decelerating a host vehicle that enhances possibility of track maintenance in complex scenarios of crowded city.

It is yet another object of the present disclosure to provide a system and method for decelerating host vehicle based on tracking of a pedestrian that tracks unpredictable motion of the pedestrian.

It is yet another object of the present disclosure to provide a system and method for decelerating a host vehicle that manages track for non-linear and highly manoeuvring relative movement of pedestrian with respect to the host vehicle.

It is yet another object of the present disclosure to provide a system and method for decelerating a host vehicle based on tracking of a pedestrian for consistent and smoother Autonomous Emergency Braking (AEB) in complex scenarios.

It is still another object of the present disclosure to provide a system and method that addresses the lane change, evasive motion of the host vehicle and abrupt motion of pedestrian.

It is still another object of the present disclosure to provide a robust, economic and simple system and method that accurately tracks a pedestrian.

SUMMARY

This summary is provided to introduce simplified concepts of a system and method for pedestrian detection, which are further described below in the Detailed Description. This summary is not intended to identify key or essential features of the claimed subject matter, nor is it intended for use in determining/limiting the scope of the claimed subject matter.

The present disclosure relates to the field of vehicle automation. More particularly, the present disclosure relates to system and method for decelerating a host vehicle based on tracking of a pedestrian.

An aspect of the present disclosure relates to a system implemented in a host vehicle for decelerating said host vehicle based on tracking of at least one pedestrian, said system comprising: an input unit comprising one or more pre-processors to receive sensed inputs from an image sensor mounted in front of the host vehicle, wherein the image sensor captures field of view of the host vehicle; a processing unit comprising a processor coupled with a memory, the memory storing instructions executable by the processor to: receive an input signal comprising one or more parameters of position and velocity of at least one pedestrian in field of view the host vehicle from the input unit, wherein the field of view of the host vehicle is classified into one or more regions; estimate trajectory of the host vehicle and trajectory of the at least one pedestrian based on one or more factors of position and velocity of the host vehicle and the one or more parameters of position and velocity of the at least one pedestrian to estimate a point of intersection of the host vehicle and the at least one pedestrian; estimate time to collision based on the estimated point of intersection and determine trajectory of the at least one pedestrian in path of the host vehicle based on any or a combination of the region in the field of view of the host vehicle, estimated trajectories of the host vehicle and the at least one pedestrian and the estimated point of intersection; assess collision risk to select the at least one pedestrian as a target based on any or a combination of time for vehicle to reach the point of intersection, time for the at least one pedestrian to reach the point of intersection and transition of the at least one pedestrian from one region to another region in field of view of the host vehicle; and generate a deceleration actuation command to decelerate the host vehicle based on the selected target, and provide the deceleration actuation command to an automatic emergency braking (AEB) unit operatively coupled with the host vehicle.

In an embodiment, the one or more parameters comprise any or a combination of lateral distance, longitudinal distance, velocity vectors and target status of the at least one pedestrian.

In an embodiment, the one or more regions comprise any or a combination of a high risk region, a medium risk region and a low risk region.

In an embodiment, the processor analyses movement of the at least one pedestrian so that the analysed movement is classified into any or a combination of longitudinal, lateral and stationary.

In an embodiment, history of any or a combination of yaw rate of the host vehicle, velocity and position of the host vehicle, and velocity and position of the at least one pedestrian are considered to determine the trajectory of the at least one pedestrian in path of the host vehicle.

In an embodiment, the deceleration actuation command is in closed loop control and is regulated continuously when time to collision is less than a pre-defined threshold value, and wherein the deceleration actuation command is regulated based on feedback of any or a combination of a gap distance between the host vehicle and the estimated point of intersection and the time for the target pedestrian to reach the point of intersection.

In an embodiment, the processor performs pre-filling actuation of the AEB unit prior to generation of the deceleration actuation command.

Another aspect of the present disclosure relates to a method for decelerating a host vehicle based on tracking of at least one pedestrian, carried out according to instructions stored in a computer implemented in the host vehicle, comprising: receiving an input signal comprising one or more parameters of position and velocity of at least one pedestrian in field of view the host vehicle from an input unit, the input unit comprising one or more pre-processors to receive sensed inputs from an image sensor mounted in front of the host vehicle, wherein the image sensor captures field of view of the host vehicle, and wherein the field of view of the host vehicle is classified into one or more regions; estimating trajectory of the host vehicle and trajectory of the at least one pedestrian based on one or more factors of position and velocity of the host vehicle and the one or more parameters of position and velocity of the at least one pedestrian to estimate a point of intersection of the host vehicle and the at least one pedestrian; estimating time to collision based on the estimated point of intersection and determine trajectory of the at least one pedestrian in path of the host vehicle based on any or a combination of the region in the field of view of the host vehicle, estimated trajectories of the host vehicle and the at least one pedestrian and the estimated point of intersection; assessing collision risk to select the at least one pedestrian as a target based on any or a combination of time for vehicle to reach the point of intersection, time for the at least one pedestrian to reach the point of intersection and transition of the at least one pedestrian from one region to another region in field of view of the host vehicle; and generating a deceleration actuation command to decelerate the host vehicle based on the selected target, and providing the deceleration actuation command to an automatic emergency braking (AEB) unit operatively coupled with the host vehicle.

Various objects, features, aspects and advantages of the present disclosure will become more apparent from the following detailed description of preferred embodiments, along with the accompanying drawing figures in which like numerals represent like features.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure, and wherein.

DETAILED DESCRIPTION

Figure 1A:
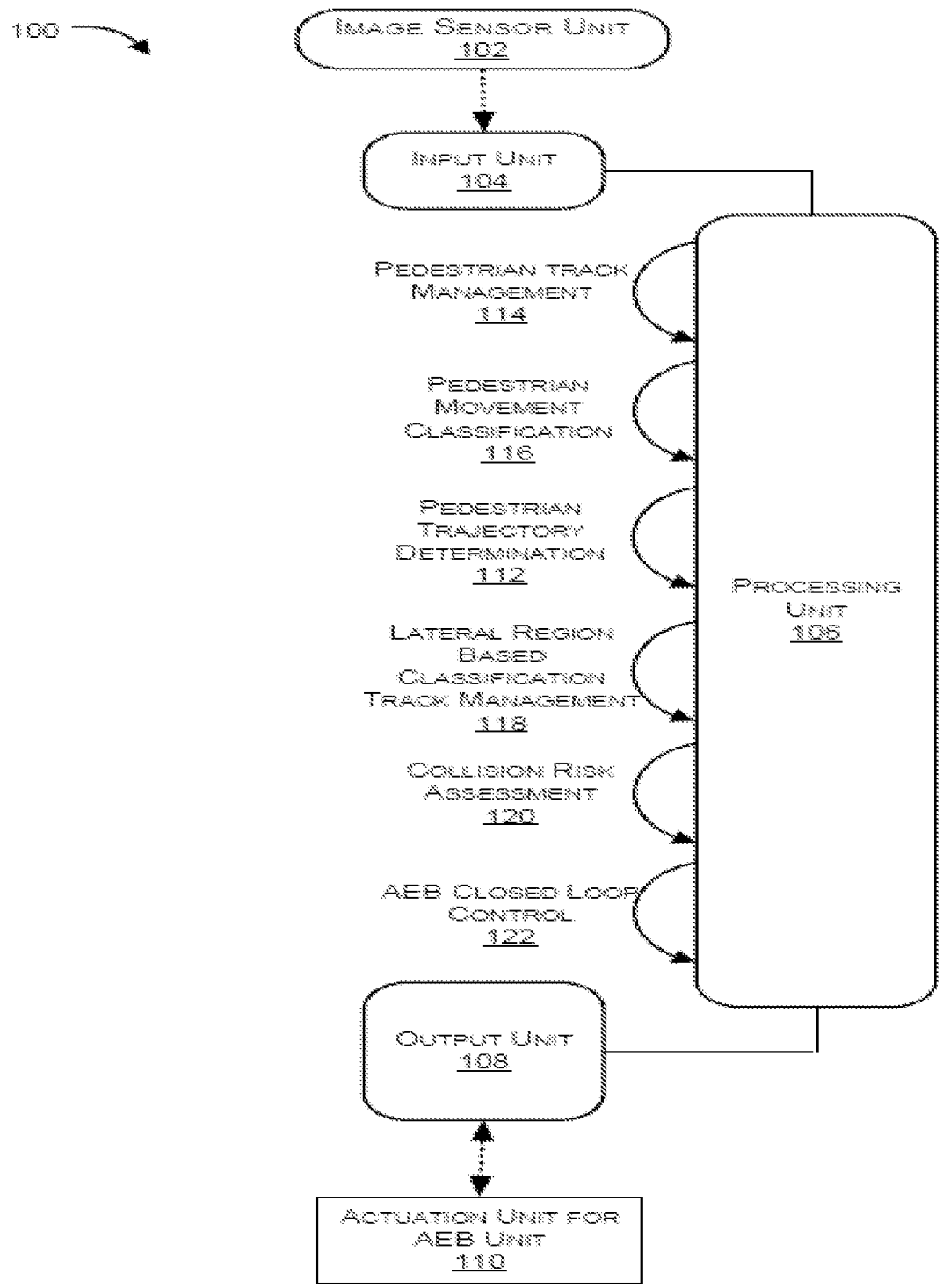
FIGS. 1A-B illustrate architecture of a pedestrian detection and tracking system to illustrate its overall working in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to the field of vehicle automation. More particularly, the present disclosure relates to system and method for decelerating a host vehicle based on tracking of a pedestrian.

An aspect of the present disclosure relates to a system implemented in a host vehicle for decelerating said host vehicle based on tracking of at least one pedestrian, said system comprising: an input unit comprising one or more pre-processors to receive sensed inputs from an image sensor mounted in front of the host vehicle, wherein the image sensor captures field of view of the host vehicle; a processing unit comprising a processor coupled with a memory, the memory storing instructions executable by the processor to: receive an input signal comprising one or more parameters of position and velocity of at least one pedestrian in field of view the host vehicle from the input unit, wherein the field of view of the host vehicle is classified into one or more regions; estimate trajectory of the host vehicle and trajectory of the at least one pedestrian based on one or more factors of position and velocity of the host vehicle and the one or more parameters of position and velocity of the at least one pedestrian to estimate a point of intersection of the host vehicle and the at least one pedestrian; estimate time to collision based on the estimated point of intersection and determine trajectory of the at least one pedestrian in path of the host vehicle based on any or a combination of the region in the field of view of the host vehicle, estimated trajectories of the host vehicle and the at least one pedestrian and the estimated point of intersection; assess collision risk to select the at least one pedestrian as a target based on any or a combination of time for vehicle to reach the point of intersection, time for the at least one pedestrian to reach the point of intersection and transition of the at least one pedestrian from one region to another region in field of view of the host vehicle; and generate a deceleration actuation command to decelerate the host vehicle based on the selected target, and provide the deceleration actuation command to an automatic emergency braking (AEB) unit operatively coupled with the host vehicle.

In an embodiment, the one or more parameters comprise any or a combination of lateral distance, longitudinal distance, velocity vectors and target status of the at least one pedestrian.

In an embodiment, the one or more regions comprise any or a combination of a high risk region, a medium risk region and a low risk region.

In an embodiment, the processor analyses movement of the at least one pedestrian so that the analysed movement is classified into any or a combination of longitudinal, lateral and stationary.

In an embodiment, history of any or a combination of yaw rate of the host vehicle, velocity and position of the host vehicle, and velocity and position of the at least one pedestrian are considered to determine the trajectory of the at least one pedestrian in path of the host vehicle.

In an embodiment, the deceleration actuation command is in closed loop control and is regulated continuously when time to collision is less than a pre-defined threshold value, and wherein the deceleration actuation command is regulated based on feedback of any or a combination of a gap distance between the host vehicle and the estimated point of intersection and the time for the target pedestrian to reach the point of intersection.

In an embodiment, the processor performs pre-filling actuation of the AEB unit prior to generation of the deceleration actuation command.

Another aspect of the present disclosure relates to a method for decelerating a host vehicle based on tracking of at least one pedestrian, carried out according to instructions stored in a computer implemented in the host vehicle, comprising: receiving an input signal comprising one or more parameters of position and velocity of at least one pedestrian in field of view the host vehicle from an input unit, the input unit comprising one or more pre-processors to receive sensed inputs from an image sensor mounted in front of the host vehicle, wherein the image sensor captures field of view of the host vehicle, and wherein the field of view of the host vehicle is classified into one or more regions; estimating trajectory of the host vehicle and trajectory of the at least one pedestrian based on one or more factors of position and velocity of the host vehicle and the one or more parameters of position and velocity of the at least one pedestrian to estimate a point of intersection of the host vehicle and the at least one pedestrian; estimating time to collision based on the estimated point of intersection and determine trajectory of the at least one pedestrian in path of the host vehicle based on any or a combination of the region in the field of view of the host vehicle, estimated trajectories of the host vehicle and the at least one pedestrian and the estimated point of intersection; assessing collision risk to select the at least one pedestrian as a target based on any or a combination of time for vehicle to reach the point of intersection, time for the at least one pedestrian to reach the point of intersection and transition of the at least one pedestrian from one region to another region in field of view of the host vehicle; and generating a deceleration actuation command to decelerate the host vehicle based on the selected target, and providing the deceleration actuation command to an automatic emergency braking (AEB) unit operatively coupled with the host vehicle.

Various embodiments of the present disclosure relates to pedestrian tracking using a camera or an image sensor processed input data for autonomous application of unmanned ground vehicle and accordingly performing actuation of a closed loop AEB unit.

Figure 1B:
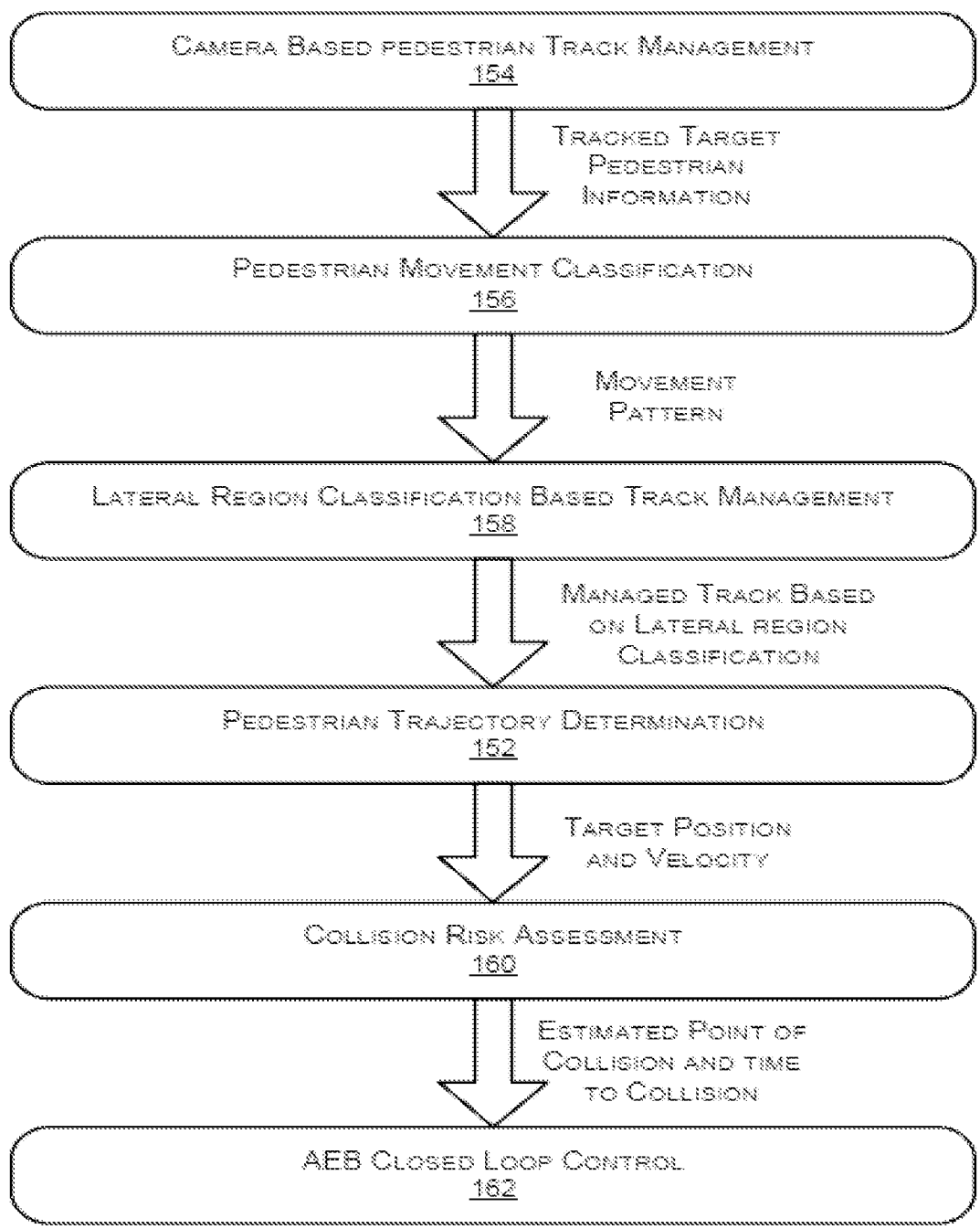

FIGS. 1A-B illustrate architecture of a pedestrian detection and tracking system to illustrate its overall working in accordance with an embodiment of the present disclosure.

According to an embodiment, a pedestrian detection and tracking system 100 (interchangeably referred to as system 100, hereinafter) is implemented in a host vehicle (interchangeably referred to as host vehicle, hereinafter). The system 100 comprises an input unit 104, a processing unit 106 and an output unit 108. The input unit 104 may comprise one or more pre-processors, which processes raw sensed inputs from an image sensor or a camera (forming part of image sensor unit 102, which is operatively coupled with the input unit 104) configured in the host vehicle to capture images of field of view of the host vehicle The pre-processed sensed inputs may comprise parameters of position and velocity of pedestrians. In an implementation, the image sensor or the camera of the image sensor unit 102 may be placed below rear-view mirror in front side of the host vehicle. The processing unit 106 may comprise a processor and a memory and/or may be integrated with existing systems and controls of a host vehicle to form an advanced driver assistance system (ADAS), or augment an existing ADAS. For instance, signals generated by the processing unit 106 may be sent to output unit 108 or an electronic control unit (ECU) of the host vehicle. The output unit 108 may be an interface that operatively couples processing unit 106 with actuation unit 110 for AEB. In an example, the output unit 106 may be a display device or any other audio-visual device that provides warning to the driver.

At input unit 104, the pre-processors perform camera measurement and pre-processing of raw data captured by the image sensor unit 102. The pre-processor of input unit 104 may receive input signals comprising a sequence of images from the image sensor unit 102.

In an embodiment, at pedestrian track management 114, the processing unit 106 performs camera based pedestrian track management 154 to determine one or more parameters of position and velocity of a tracked pedestrian in field of view of the host vehicle from the input signal. The one or more parameters comprise any or a combination of lateral distance, longitudinal distance, velocity vectors and target status of the pedestrian tracking.

In an embodiment, at pedestrian movement classification 116, the processing unit 106 performs pedestrian movement classification 156 and lateral region classification based track management 158 to analyse movement of the pedestrians so that the analysed movement is classified into any or a combination of longitudinal, lateral and stationary. The field of view of the host vehicle is classified into one or more regions comprising high risk region, a medium risk region and a low risk region.

In an embodiment, during pedestrian trajectory determination 112 and 152, the processing unit 106 estimates trajectory of the host vehicle and trajectory of the pedestrians based on one or more factors of position and velocity of the host vehicle and one or more parameters of position and velocity of the pedestrians for pedestrian track management. History of any or a combination of yaw rate of the host vehicle, velocity and position of the host vehicle, and velocity and position of the pedestrians are considered to determine the position history of the pedestrians and vehicle in the present vehicle co-ordinate frame. Further, the processing unit 106 performs track management and estimates trajectory of the pedestrian in path of the host vehicle based on any or a combination of the region in the field of view of the host vehicle, estimated trajectories of the host vehicle and the pedestrians and the estimated point of intersection.

In an aspect, at collision risk assessment 120 and 160, the processing unit 106 estimates time to collision with pedestrian by assessing collision risk to select a pedestrian as a target based on time for vehicle to reach the point of intersection and time for the pedestrian to reach the point of intersection, which is basically estimated point of collision with target pedestrian based on transition of the pedestrian from one region to another region in field of view of the host vehicle.

Furthermore, during AEB control 122, the processing unit 106 performs AEB closed loop control 162 to generate a deceleration actuation command to decelerate the host vehicle based on the selected target in an anticipation of collision, and provides the deceleration actuation command to the actuation unit 110 for AEB, the actuation unit 110 being operatively coupled with the host vehicle. In an embodiment, the processing unit 106 performs pre-filling actuation of the AEB unit prior to generation of the deceleration actuation command in an anticipation of collision.

Figure 2:
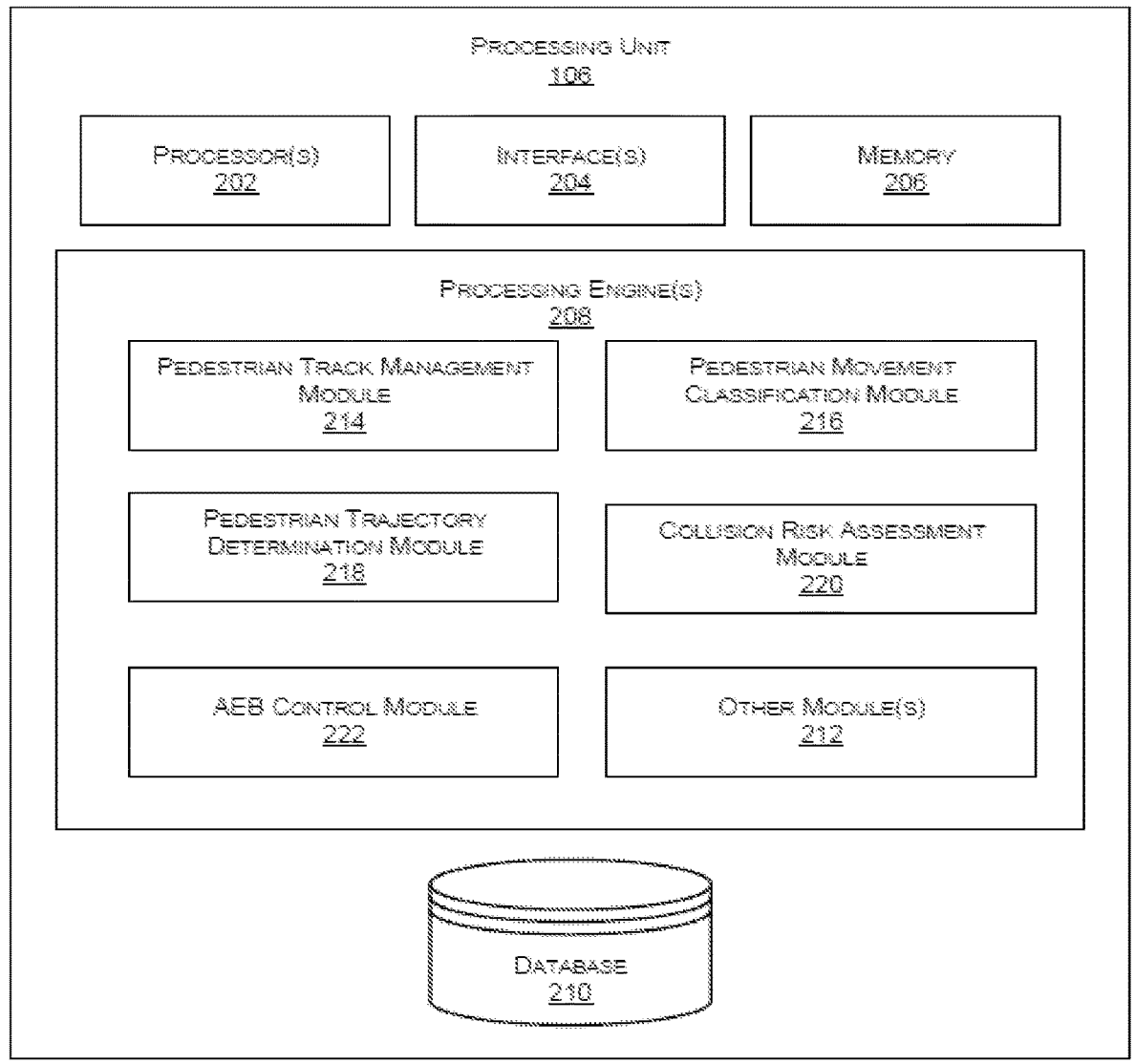
FIG. 2 illustrates exemplary modules of a processing unit in accordance with an embodiment of the present disclosure.

FIG. 2 illustrates exemplary modules of a processing unit in accordance with an embodiment of the present disclosure.

In an aspect, the processing unit 106 may comprise one or more processor(s) 202. The one or more processor(s) 202 may be implemented as one or more microprocessors, microcomputers, microcontrollers, digital signal processors, central processing units, logic circuitries, and/or any devices that manipulate data based on operational instructions. Among other capabilities, the one or more processor(s) 202 are configured to fetch and execute computer-readable instructions stored in a memory 206 of the processing unit 106. The memory 206 may store one or more computer-readable instructions or routines, which may be fetched and executed to create or share the data units over a network service. The memory 206 may comprise any non-transitory storage device including, for example, volatile memory such as RAM, or non-volatile memory such as EPROM, flash memory, and the like.

The processing unit 106 may also comprise an interface(s) 204. The interface(s) 204 may comprise a variety of interfaces, for example, interfaces for data input and output devices, referred to as I/O devices, storage devices, and the like. The interface(s) 204 may facilitate communication of processing unit 106 with various devices coupled to the processing unit 106 such as the input unit 104 and the output unit 108. The interface(s) 204 may also provide a communication pathway for one or more components of the processing unit 106. Examples of such components include, but are not limited to, processing engine(s) 208 and data 210.

The processing engine(s) 208 may be implemented as a combination of hardware and programming (for example, programmable instructions) to implement one or more functionalities of the processing engine(s) 208. In examples described herein, such combinations of hardware and programming may be implemented in several different ways. For example, the programming for the processing engine(s) 208 may be processor executable instructions stored on a non-transitory machine-readable storage medium and the hardware for the processing engine(s) 208 may comprise a processing resource (for example, one or more processors), to execute such instructions. In the present examples, the machine-readable storage medium may store instructions that, when executed by the processing resource, implement the processing engine(s) 208. In such examples, the processing unit 106 may comprise the machine-readable storage medium storing the instructions and the processing resource to execute the instructions, or the machine-readable storage medium may be separate but accessible to processing unit 106 and the processing resource. In other examples, the processing engine(s) 208 may be implemented by electronic circuitry.

The database 210 may comprise data that is either stored or generated as a result of functionalities implemented by any of the components of the processing engine(s) 208.

In an exemplary embodiment, the processing engine(s) 208 may comprise a pedestrian track management module 214, a pedestrian movement classification module 216, a pedestrian trajectory determination module 218, a collision risk assessment module 220, an AEB control module 222 and other module(s) 212.

It would be appreciated that modules being described are only exemplary modules and any other module or sub-module may be included as part of the system 100 or the processing unit 106. These modules too may be merged or divided into super-modules or sub-modules as may be configured.

In an aspect, one or more pre-processors of an input unit operatively coupled with the processing unit 106 perform camera measurement and pre-processing of raw data captured by an image sensor to receive an input signal comprising a sequence of images of field of view of the host vehicle.

Pedestrian Track Management Module 214

According to an aspect, the pedestrian track management module 214 determines one or more parameters of position and velocity of at least one tracked pedestrian in field of view of the host vehicle from the input signal. The field of view of the host vehicle may be classified into one or more regions comprising a high risk region, a medium risk region and a low risk region. The one or more parameters may comprise any or a combination of lateral distance, longitudinal distance, velocity vectors and target status of the pedestrian.

According to an embodiment, the module 214 performs camera based track management by tracking position of the pedestrian based on suitable estimation technique like Kalman filter estimation. The module 214 may perform movement tracking and velocity vector estimation of the pedestrian as velocity vector provided by camera may not be accurate for directly usage for pedestrian tracking.

According to an embodiment, grid based track management may be performed, which includes track initialization, track management cell definition, track association and prediction. Furthermore, in an example, parameters of position and velocity of the pedestrian and vehicle may be derived from track management and estimation technique using Kalman filter and in Grid transformation to eliminate/reduce the effect of noise and clutter. In context of the present example, pedestrian tracking works based on target information obtained from processing of the received input signal and pedestrian track management reduces uncertainty out of sensed information. Further, sensed information is modelled to extract measurement information/parameters, which may include lateral distance, longitudinal distance, velocity vectors and target status of the pedestrian. Thus output of the module 214 may comprise identifier, position, velocity, and confidence of the pedestrian.

Pedestrian Movement Classification Module 216

Those skilled in the art would appreciate that for track management of the pedestrian, movement of the pedestrian is challenging in respect of lateral motion, as camera provided lateral distance may not be very accurate for usage in emergency application such as pedestrian AEB. Thus, detected area by input unit may be classified into three regions in lateral segments, i.e., high risk region, medium risk region and low risk region. The consistency of the movement of pedestrian may be tracked over movement from low-risk region to medium-risk region and then to high risk region. The high-risk region is basically the region, which overlays in path of the host vehicle considering width of the host vehicle. The medium-risk region is the region from edge of the host vehicle to width of an adjacent lane. The low-risk region is any region that lies far away from medium-risk region.

In an example, for discretion of consistency check for pedestrian movement, the pedestrian moving towards the host vehicle path passes in laterally low-risky region and then lateral medium-risky region is considered as a potential threat to host vehicle. Further, when time to reach an intersection point for the pedestrian and the host vehicle are equal, then this situation may be considered as high risk situation and AEB actuation may be performed. In other example, the pedestrian moving from the host vehicle path passes laterally from high-risky region to laterally medium-risky region may not be considered as a potential threat to host vehicle provided that time to reach an intersection point by the pedestrian and the host vehicle are not equal.

In an embodiment, the processor analyses movement of the pedestrian so that the analysed movement may be classified into any or a combination of longitudinal, lateral and stationary. The longitudinal movement is when position of the pedestrian changes in longitudinal region and the pedestrian belongs to same lateral region. The longitudinal movement can be either pedestrian moving towards the host vehicle or moving away from the host vehicle. The lateral movement is when there is change in position of the pedestrian in lateral region. The lateral movement can be either of the following: pedestrian moving towards the high path of host vehicle, pedestrian moving away from the path of host vehicle and the pedestrian is stationary when there is minimal change in position of the pedestrian in longitudinal region and there is no change in lateral region.

Those skilled in the art would appreciate that pedestrian classification aids to identify the intended target pedestrian. To provide clarity, an example with combination of different pedestrians is demonstrated herewith. In context of the present example, pedestrian-1 (PD-1) may be the laterally moving pedestrian and closest to host vehicle, PD-2 may be the second pedestrian longitudinally closest to host vehicle initially and in path of host vehicle, however moving away from host vehicle, and PD-3 may be static pedestrian and farthest to host vehicle for analysing AEB activation. The possible AEB level and deceleration computation is performed based on type of above defined movements e.g. in case target PD-1 is moving laterally and moving out of host vehicle path, deceleration may not be applied. In case PD-2 is longitudinally moving away or farthest with a speed such that the point of collision is farthest compared to PD-3 then AEB braking may be actuated based on longitudinal distance of PD-3. Thus, such complicated problem may be addressed and resolved using pedestrian movement classification.

Pedestrian Trajectory Determination Module 218

In an embodiment, the module 218 estimates trajectory of the host vehicle and trajectory of the pedestrian based on one or more factors of position and velocity of the host vehicle and one or more parameters of position and velocity of the pedestrian to estimate a point of intersection of the host vehicle and the pedestrian, which is eventually estimated point of collision between the host vehicle and the target pedestrian.

In an example, the positions of the host vehicle and the pedestrian are estimated to estimated point of collision or point of intersection. The transformation of position of the host vehicle ($Veh_{x_{(t-1)|t}}$, $Veh_{y_{(t-1)|t}}$) and pedestrian ($PD_{x_{(t-1)|t}}$, $PD_{y_{(t-1)|t}}$) at $t^{th}$ vehicle frame are function of the host vehicle (HV) velocity, host vehicle yaw rate and previous instance ($Veh_{x_{(t-1)|(t-1)}}$, $Veh_{y_{(t-1)|(t-1)}}$) and pedestrian ($PD_{x_{(t-1)|(t-1)}}$, $PD_{y_{(t-1)|(t-1)}}$) respectively and position history in present vehicle co-ordinate frame.

Furthermore, velocity vectors of the pedestrian and the host vehicle are derived from output of the module 214. The position history of vehicle and pedestrian may be transformed into present vehicle co-ordinate frame as follows:

$$\begin{bmatrix} Veh_{x(m-1)|m} \\ Veh_{y(m-1)|m} \end{bmatrix} = \begin{bmatrix} Veh_{x(m-1)|(m-1)} \\ Veh_{y(m-1)|(m-1)} \end{bmatrix} - \begin{bmatrix} \sin(\psi_{HV_{m-1}} * dT) \\ \cos(\psi_{HV_{m-1}} * dT) \end{bmatrix} \left[ v_{HV_{m-1}} * dT \right] \quad (1)$$

$$\begin{bmatrix} PD_{x(m-1)|m} \\ PD_{y(m-1)|m} \end{bmatrix} = \begin{bmatrix} PD_{x(m-1)|(m-1)} \\ PD_{y(m-1)|(m-1)} \end{bmatrix} - \begin{bmatrix} \sin(\psi_{HV_{m-1}} * dT) \\ \cos(\psi_{HV_{m-1}} * dT) \end{bmatrix} \left[ v_{HV_{m-1}} * dT \right] \quad (2)$$

where, $(Veh_{x_{(t-1)|t}}, Veh_{y_{(t-1)|t}})$ $(Veh_{x_{(m-1)|m}}, Veh_{y_{(m-1)|m}})$ and $(PD_{x_{(m-1)|m}}, PD_{y_{(m-1)|m}})$ are transformed vehicle and pedestrian positions respectively at $(m-1)^{th}$ time in vehicle co-ordinate frame at m time;

$$\left(Veh_{x_{(t-1)|(t-1)}}, Veh_{y_{(t-1)|(t-1)}}\right) \text{ and } \left(Veh_{x_{(m-1)|(m-1)}}, Veh_{y_{(m-1)|(m-1)}}\right)$$

are vehicle and pedestrian positions (longitudinal and lateral positions) at $(m-1)^{th}$ time frame in vehicle co-ordinate frame at $(m-1)^{th}$ time frame;

$\psi_{HV_{t-1}}, \psi_{HV_{m-1}}$ and $v_{HV_{t-1}}, v_{HV_{m-1}}$ are yawrate and longitudinal velocity of host vehicle at $(m-1)^{th}$ time frame; and dT is the sampling time m can be t, (t−1), (t−2) . . . , (t−n+1)

Figure 3:
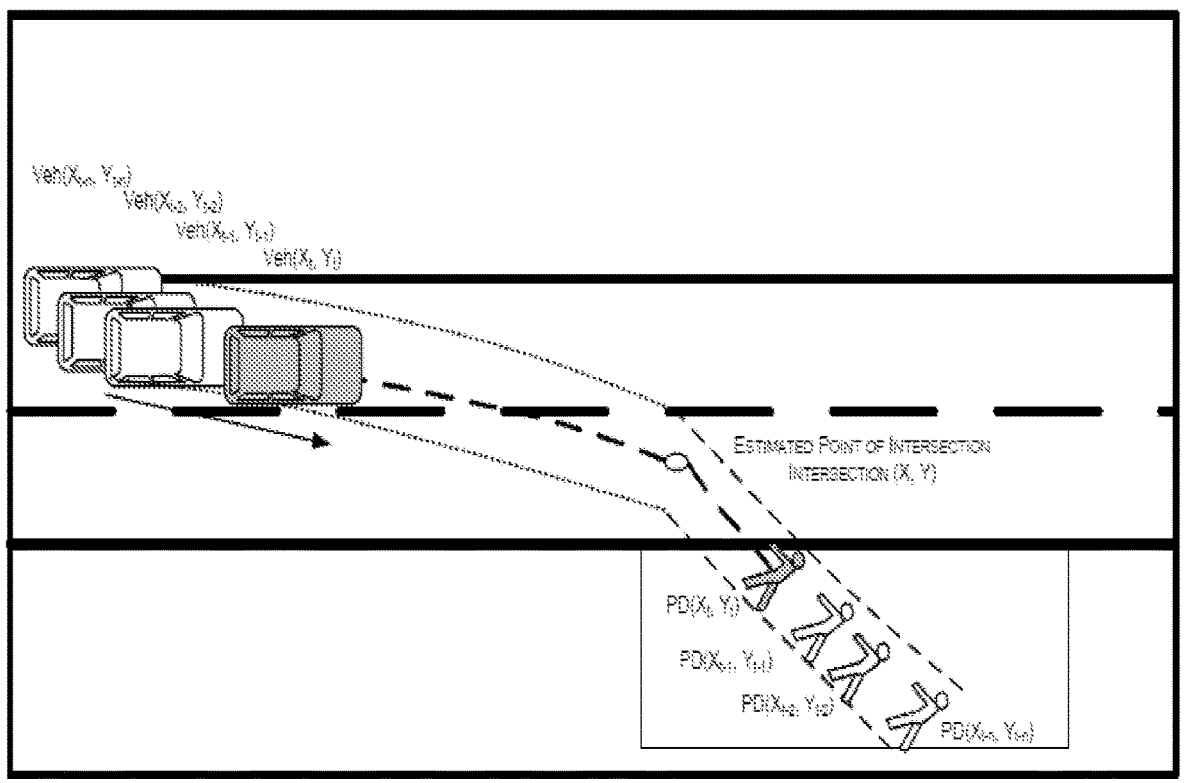
FIG. 3 illustrates exemplary representation of estimating point of collision in accordance with an embodiment of the present disclosure.

In context of the present example, an estimated point of intersection is represented in FIG. 3. The estimated point of intersection is point where the estimated trajectory of pedestrian intersects the estimated trajectory of the host vehicle in vehicle co-ordinate frame. For example, the present vehicle and pedestrian positions are Veh($x_t,y_t$) and PD($x_t,y_t$) respectively. Previous history of vehicle are Veh($x_{t-1},y_{t-1}$), Veh($x_{t-2},y_{t-2}$),Veh($x_{t-n},y_{t-n}$) and previous history of pedestrian are PD($x_{t-1},y_{t-1}$), PD($x_{t-2},y_{t-2}$), PD($x_{t-n},y_{t-n}$). Based on the trajectory estimated from position history of vehicle and trajectory estimated from position history of pedestrian, the point of intersection of trajectories of host vehicle and pedestrian is computed.

The point of intersection is probable point of collision of the host vehicle and the pedestrian. Hence, time to collision is computed based on the intersection point. The point of intersection may address straight line or maneuvering motion of the host vehicle as well as abrupt lateral and longitudinal motion of the pedestrian.

Figure 4:
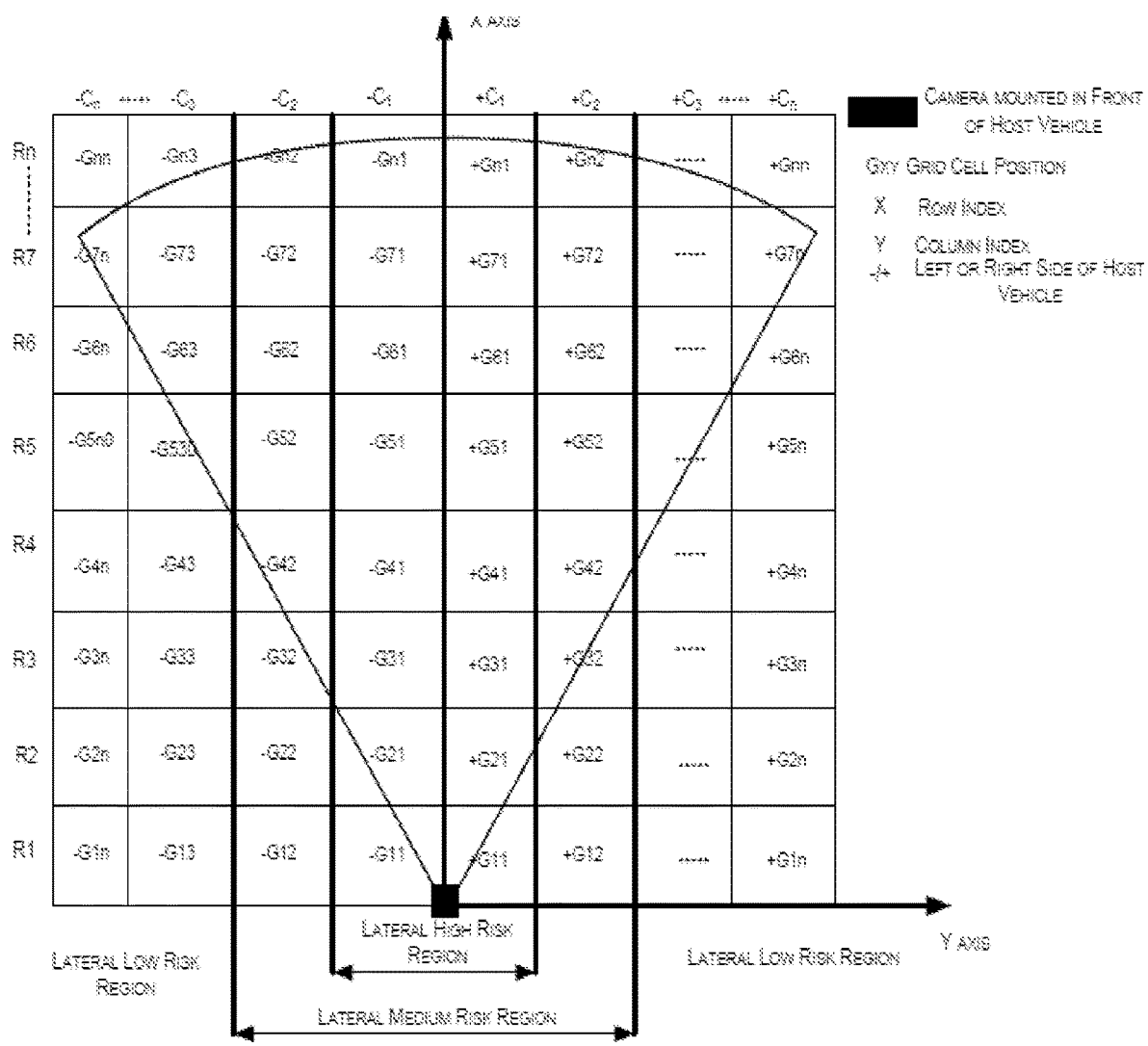
FIG. 4 illustrates various regions in field of view of the host vehicle in accordance with an embodiment of the present disclosure.

Furthermore, in an embodiment the module 218 may consider history of any or a combination of yaw rate of the host vehicle, velocity and position of the host vehicle, and velocity and position of the pedestrian to determine the trajectory of the pedestrian in path of the host vehicle. The module 218 may determine the pedestrian which is in path of the host vehicle based on lateral risk region identification and above-mentioned estimation of trajectories and point of intersection. In an example, width of lateral high risk region is function of vehicle width and lateral mounting position of camera; the width of lateral medium risk region is function of adjacent lane whereas the region beyond medium risk and within range of camera field of view is considered as low risk region. Any region outside camera field of view is no risk region. Various regions are represented in FIG. 4. The pedestrian trajectory at the estimated point of collision is compared with the trajectory of vehicle considering ego motion (speed, yaw rate) of the host vehicle to determine the pedestrian in-path trajectory.

In an embodiment, the lateral and longitudinal velocities of pedestrian is computed based on relative velocities of pedestrian measured by camera sensor and vehicle velocities of host vehicle measured by vehicle sensors.

Collision Risk Assessment Module 220

In an embodiment, the module 220 assesses collision risk to select the pedestrian as a target based on any or a combination of time for vehicle to reach the point of intersection, time for the at least one pedestrian to reach the point of intersection and transition of the pedestrian from one region to another region in field of view of the host vehicle.

As discussed above, the movement of the pedestrian may be classified into lateral, longitudinal and stationary. Those skilled in the art would appreciate that the sensed position data from the input unit is non-consistent, which creates a challenge for decision for AEB actuation. The most challenging is lateral movement of the pedestrian as even a minor inconsistency in lateral position enables to decide whether laterally pedestrian is in the path of the host vehicle or not.

In context of the present disclosure, in case, the pedestrian is moving from low risk towards high risk, the identified pedestrian may be considered as selected target. However, in case if pedestrian moves from high risk region to medium risk region, the pedestrian may not be considered as selected target for AEB actuation.

In an embodiment, during collision risk assessment, the time to collision (TTC) is computed, which is one of the most important attribute of AEB, based on which, AEB level is generally determined. $TTC_{HV}TTI_{HV}$ and $TTI_{PD}$ are time for HV to reach intersection point and time for pedestrian to reach intersection point. In case, $TTI_{HV}$ and $TTI_{PD}$ are almost equal to each other then only collision between host vehicle and pedestrian is possible and thereby TTC is computed which equals to $TTI_{HV}$. In other word, the difference of $TTI_{HV}$ and $TTI_{PD}$ are within a threshold (which is function of host vehicle longitudinal velocity and width of host vehicle) to conclude the anticipation of collision with the pedestrian and further TTC in anticipation of collision with that pedestrian is computed. It has to be appreciated, calculation of TTC is dynamic in nature as TTC depends on distance to reach intersection point by host vehicle and pedestrian respectively and their respective velocities and may be demonstrated through following equation:

$$TTC_{HV} = \frac{p_{HV}}{v_{HV}} \qquad (3)$$

$$TTI_{HV} = \frac{p_{HV}}{v_{HV}}$$

where, $p_{HV}$ is gap distance in between the host vehicle and the point of intersection and $v_{HV}$ is longitudinal velocity of the host vehicle.

$$TTI_{PD} = \frac{p_{PD}}{v_{PD}} \qquad (4)$$

where, $p_{PD}$ is gap in between the pedestrian and the point of intersection and $v_{PD}$ is velocity of the pedestrian.

In embodiment, the pedestrian in path trajectory may be concluded based on the estimated time to collision of the host vehicle to reach the point of collision and pedestrian to reach the point of collision. The pedestrian collision risk assessment may be concluded and target may be considered as selected pedestrian target in anticipation of collision based on following considerations:

a) The estimated time for vehicle to reach the point of collision or intersection $TTC_{HV}TTI_{HV}$ and the estimated time for pedestrian to reach the estimated point of collision or intersection $TTI_{PD}TTC_{PD}$ nearly equals each other. In other word, the difference of $TTI_{HV}$ and $TTI_{PD}$ shall be within a threshold (which is function of host vehicle longitudinal velocity and width of host vehicle) to conclude the anticipation of collision and TTC computation.

b) Lateral Region based classification track management.

AEB Control Module 222

In an embodiment, the module 222 generates a deceleration actuation command to decelerate the host vehicle based on the selected target pedestrian, and provide the deceleration actuation command to an actuation unit for AEB, the actuation unit being operatively coupled with the host vehicle.

Those skilled in the art would appreciate that actuation unit provides deceleration or brake to the host vehicle in emergency. If a preceding vehicle is detected, then the AEB control module 222 may assess estimated time to collision of host vehicle or estimated time to reach the point of intersection from collision risk assessment module 220. If $TTC_{HV}$ for the selected target falls below pre-defined TTC threshold values, then the module 222 may provide collision warning (CW) to driver. If the driver is unresponsive to the warning, then the module 222 may generate deceleration command to apply deceleration or brake in say two levels i.e. first level speed reduction brake (SRB) and second level mitigation brake (MB).

Figure 5A:
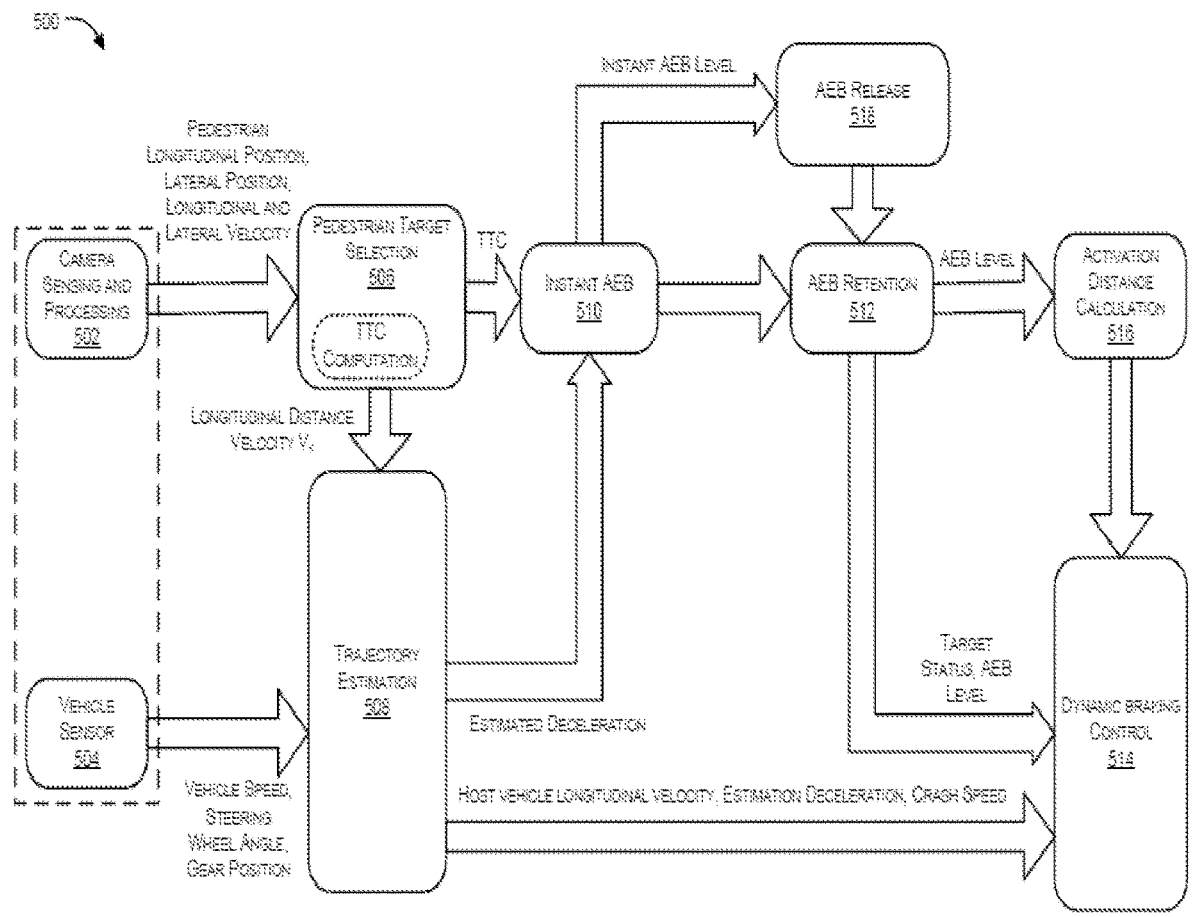
FIGS. 5A-C illustrate exemplary implementations of AEB control module in accordance with an exemplary embodiment of the present disclosure.

In an example, a proportional and derivative controller (PD) based AEB control module 222 may be used to calculate deceleration or brake value. An exemplary PD based AEB control module 222 is represented in FIG. 5A, which comprises subsystems such as TTC computation in 506 which is part of module 220, trajectory estimation 508, instant AEB actuation 510, AEB retention 512, dynamic braking control 514, activation distance calculation 516 and AEB release (due to false positive) 518. TTC may be computed as:

$$TTC = \frac{p_x}{v_x} \quad (5)$$

$$TTC = \frac{p_x}{v_x}$$

Those skilled in the art would appreciate that for efficient working of module 222, certain attributes must be set based on, which required deceleration may be applied. Based on the host vehicle velocity and distance between the host vehicle and the distance of vehicle to point of intersection, i.e. gap ($p_{HV}$), the trajectory estimation 508 may calculate total deceleration, which decides the AEB levels. It may not be possible to stop the host vehicle from any vehicle speed in an emergency, but application of AEB would reduce velocity of the host vehicle to a safety limit to reduce the impact of collision if collision avoidance is not completely possible, which is for example, 40 kmph velocity reduction margin from AEB activation velocity. The trajectory estimation 508 may compute the reduced targeted velocity of collision as crash speed such that the host vehicle may achieve the crash speed within the safety distance from the target pedestrian at the estimated point of collision.

$$Deceleration_{Estimated} = \frac{(v_{HV} - v_{Crash})^2}{(p_{HV} - p_{safety})} \quad (6)$$

$$Decelerartion_{Estimated} = \frac{(v_x - v_{Crash})^2}{(p_K - p_{safety})}$$

where, $p_{HV}$ is distance to estimated point of collision with target pedestrian;

$p_{safety}$ is safety margin of distance for AEB application;

$v_{HV}$ is longitudinal velocity of the host vehicle; and $v_{Crash}$ is computed speed at which the host vehicle is planned to collide with target.

At each time sample, data is received from various sensors (502 and 504), based on which, estimated deceleration is computed. At block 508, if gear position is reverse and steering angle is very high, AEB operation will be disabled. At instant AEB 510, AEB level (CW, SRB, MB) is checked at each time sample to decide whether AEB is required or not based on whether, i.e. TTC is less than an AEB brake pre-defined threshold.

In case, estimated deceleration is greater than equal to MB deceleration activation threshold, instant AEB equals to MB mode. In case estimated deceleration greater than equal to SRB deceleration activation threshold, instant AEB equals to SRB mode. In case, estimated deceleration is greater than equal to CW deceleration activation threshold, then instant AEB equals to CW mode.

Therefore, at each time sample, instant AEB 510 is either changing or maintaining some certain level (CW, SRB, MB, No AEB activation), to perform specific task, dedicated to each level, the level should be retained, if it maintains each level for some time range. AEB retention 512 may hold the AEB level till next level of AEB is triggered by checking the instant AEB 510 and AEB release 518.

In an example, following AEB levels may be considered:
AEB level 0: Normal with no threat of AEB activation
AEB level 1: Collision warning (CW) activation with pre-fill actuation
AEB level 2: Speed reduction braking (SRB) activation mode
AEB level 3: Mitigation braking (MB) activation mode Therefore, the deceleration actuation command is in closed loop control and is regulated continuously when TTC is less than a pre-defined threshold value. Further, the deceleration actuation command is regulated based on feedback of any or a combination of a gap distance between the host vehicle and the estimated point of intersection and velocity of the host vehicle.

In an embodiment, the dynamic braking control 514 responds dynamically by taking host vehicle velocity and gap distance or estimated distance to intersection point as feedback signal at every time sample and provides required deceleration command as output within some range to follow the reference signal crash speed. As the AEB deceleration command keeps changing by considering the output feedback signal at every time sample, the AEB works dynamically in closed loop.

Figure 5B:
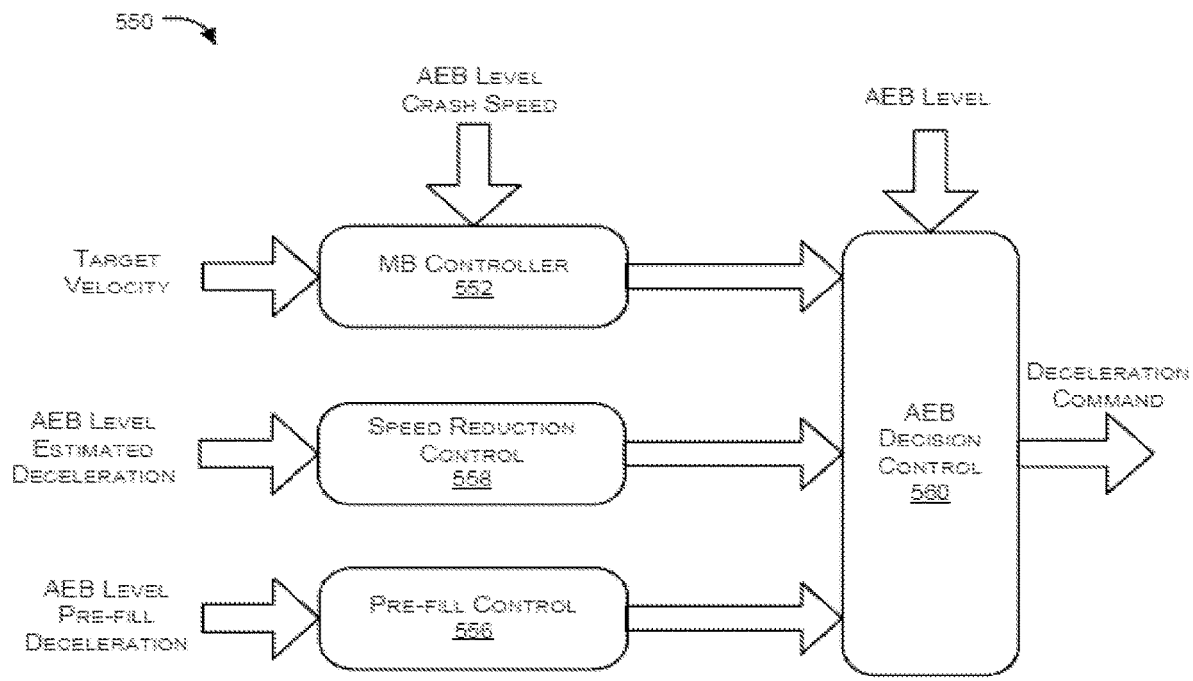

FIG. 5B represents exemplary block diagram of dynamic braking control 514. In an example, in CW AEB level, minute deceleration may be applied using pre-fill control 556. In SRB AEB level, estimated deceleration flows as deceleration command at output of dynamic braking control 514. In MB AEB level, PD controller may be used with first order low pass filter.

In an example, MB controller 552 is a closed loop proportional and derivative controller that may be used to compute dynamic deceleration, where the error is computed by comparing feedback of host vehicle velocity from vehicle sensor and computed crash speed. Furthermore, additional inputs to dynamic braking control 514 are AEB level and target crossing flag computed at block 518. Once AEB level moves to level 3 or MB level and target crossing flag is enabled i.e. the host vehicle has crossed safety margin or crossed the target pedestrian with level 3 condition, the deceleration command from MB controller 552 may be set to maximum deceleration value for AEB operation and may not be released till vehicle come to static condition. This helps AEB operation to prevent from any acceleration of vehicle after entering safety region or crossing pedestrian as camera sensor may not be able to detect the target within minimum of safety region e.g. 5 m from target nearing point of collision. Thus, AEB operation may reduce the impact even after collision between host vehicle and target pedestrian.

Figure 5C:
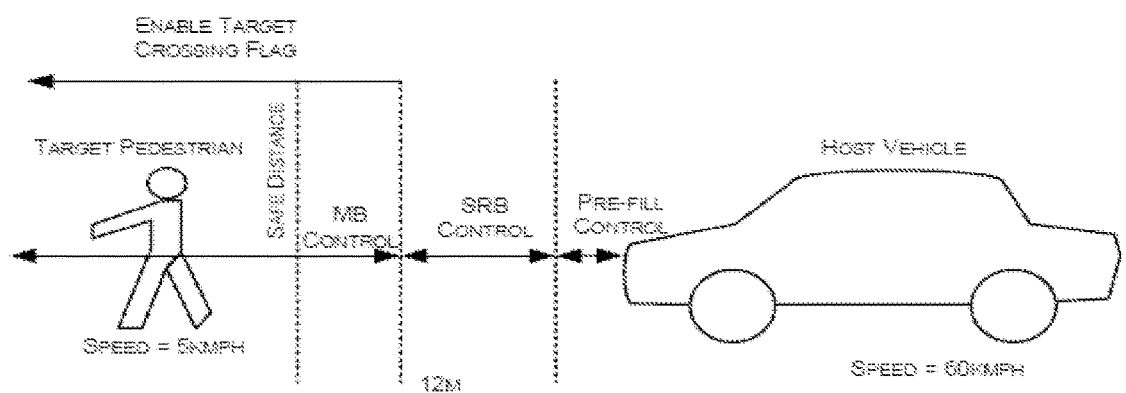

In context of the present example for activation distance calculation in block 516, the activation distance is the distance from point of intersection at which AEB level transit from level 1 to level 2. The AEB release 518 may force the dynamic braking control 514 to provide deceleration command zero, based on the p_HV and AEB level. Furthermore, AEB release 518 protects false target activation of AEB for longer time and thus releases AEB. Additionally, in block 518 target crossing flag is computed, which decides whether the target pedestrian information is not available due to false positive or because host vehicle crossed the target pedestrian after collision or after crossing safety margin where camera sensor may not be able to detect target due to close vicinity. The target crossing flag as shown in FIG. 5C shall be used as input in MB Control 552. The deceleration commands may be provided to the actuation unit for AEB using AEB decision control 560. For example, even after activation of AEB, if the target starts to move faster than ego vehicle suddenly, by checking pHV and AEB level, it deactivates AEB.

An example of AEB actuation and control is illustrated in FIG. 5C. In an example, the host vehicle is running at 60 kmph and target pedestrian is running at 5 kmph. At certain distance from estimation point of collision with target, collision warning may be enabled and further pre-fill control 556. With pre-fill control, the host vehicle may start to decelerate by very low value, e.g. −0.3 m/s² and act as pre-fill actuation. This doesn't have a observable impact on vehicle motion under normal operation as such minor deceleration is applied for insignificant time of collision warning which further may get converted to SRB in anticipation of collision or may be withdrawn in case false activation. The major concept of pre-filling actuation during collision warning engage in making the AEB unit ready for AEB actuation and the delay in response of braking is avoided once, the AEB control module 222 directly goes to SRB or MB level and the performance of braking is enhanced. Thus, consistency and smooth actuation of AEB unit is achieved avoiding delay in emergency scenario, which provides improved performance to AEB actuation.

In context of the present example, after CW, the host vehicle enters into the SRB region, where AEB Level is equal to level 2. Required deceleration is applied with maximum limit, e.g., −3 m/s². At the time of being within SRB region, only estimated deceleration works, which is based on kinematics equation of motion, i.e.

$$a = (v^2 - u^2)/2s \quad (6)$$

where, v is final intended velocity, i.e. crash speed, u is initial velocity of host vehicle, i.e $v_{HV}$, s is distance from estimated point of intersection, i.e. $p_{HV}$ and a is estimated deceleration.

Further, when the host vehicle enters the MB region, dynamic braking control 514 enables the host vehicle to enter into safe distance region with speed 1 reduction e.g. 40 kmph. In this case, crash speed or intended reduced velocity of host vehicle at the point of collision may be given by:

$$\text{Crash Speed} = (\text{Host Vehicle Longitudinal Velocity} - \quad (7)$$
$$\text{Target Pedestrain longitudinal velocity}) -$$
$$\text{Velocity reduction margin from } AEB \text{ activation } velocity \text{Crash Speed} =$$
$$(\text{Host Vehicle Longitudinal Velocity} -$$
$$\text{Target Pedestrain longitudinal velocity})$$
$$- \text{Velocity reduction margin from } AEB \text{ activation velocity}$$

For example, $$\text{Crash Speed} = (60 - 5) - 40 = 15 \text{ kmph} \quad (8)$$
$$\text{Crash Speed} = (60 - 5) - 40 = 15 \text{ kmph}$$

Other Modules 212

In an aspect, other modules 212 implement functionalities that supplement applications or functions performed by the system 100, processing unit 106 or the processing engine(s) 208.

Although the proposed system has been elaborated as above to include all the main modules, it is completely possible that actual implementations may include only a part of the proposed modules or a combination of those or a division of those into sub-modules in various combinations across multiple devices that may be operatively coupled with each other, including in the cloud. Further the modules may be configured in any sequence to achieve objectives elaborated. Also, it may be appreciated that proposed system may be configured in a computing device or across a plurality of computing devices operatively connected with each other, wherein the computing devices may be any of a computer, a smart device; an Internet enabled mobile device and the like. Therefore, all possible modifications, implementations and embodiments of where and how the proposed system is configured are well within the scope of the present invention.

Figure 6:
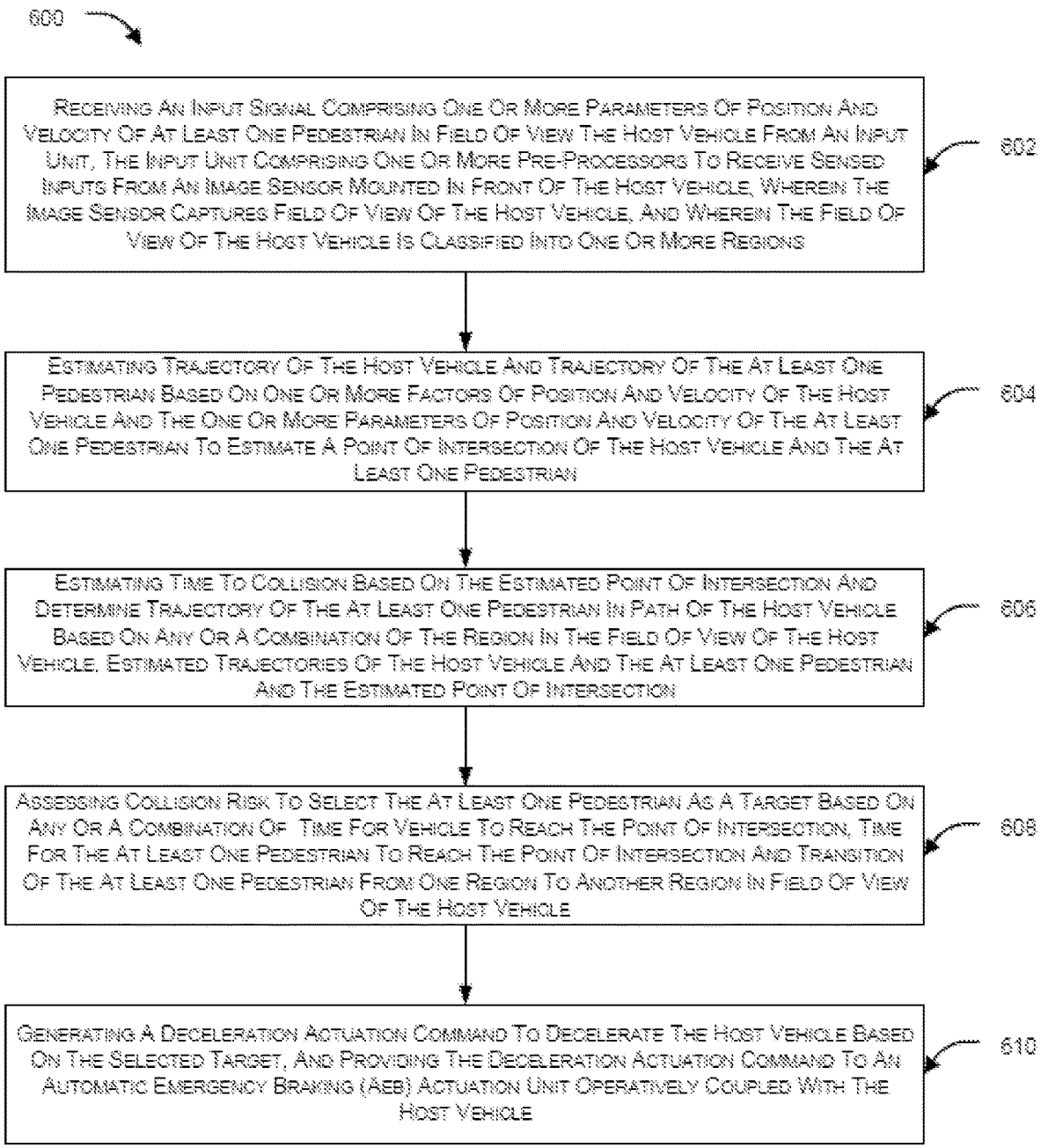
FIG. 6 is a flow diagram illustrating a method for decelerating a host vehicle based on tracking of a pedestrian in an anticipation of collision between host vehicle and pedestrian in accordance with an embodiment of the present disclosure.

FIG. 6 is a flow diagram illustrating a method for decelerating a host vehicle based on tracking of pedestrian in accordance with an embodiment of the present disclosure.

In an aspect, the proposed method may be described in general context of computer executable instructions. Generally, computer executable instructions can include routines, programs, objects, components, data structures, procedures, modules, functions, etc., that perform particular functions or implement particular abstract data types. The method can also be practiced in a distributed computing environment where functions are performed by remote processing devices that are linked through a communications network. In a distributed computing environment, computer executable instructions may be located in both local and remote computer storage media, including memory storage devices.

The order in which the method as described is not intended to be construed as a limitation, and any number of the described method blocks may be combined in any order to implement the method or alternate methods. Additionally, individual blocks may be deleted from the method without departing from the spirit and scope of the subject matter described herein. Furthermore, the method may be implemented in any suitable hardware, software, firmware, or combination thereof. However, for ease of explanation, in the embodiments described below, the method may be considered to be implemented in the above described system.

In an aspect, present disclosure elaborates upon a method for decelerating a host vehicle based on tracking of pedestrians that comprises, at block 602, receiving an input signal comprising one or more parameters of position and velocity of at least one pedestrian in field of view the host vehicle from an input unit, the input unit comprising one or more pre-processors to receive sensed inputs from an image sensor mounted in front of the host vehicle. The image sensor captures field of view of the host vehicle, and the field of view of the host vehicle is classified into one or more regions. The method comprises at block 604, estimating trajectory of the host vehicle and trajectory of the at least one pedestrian based on one or more factors of position and velocity of the host vehicle and the one or more parameters of position and velocity of the at least one pedestrian to estimate a point of intersection of the host vehicle and the at least one pedestrian.

The method further comprises at block 606, estimating a time to collision based on the estimated point of intersection and determine trajectory of the at least one pedestrian in path of the host vehicle based on any or a combination of the region in the field of view of the host vehicle, estimated trajectories of the host vehicle and the at least one pedestrian and the estimated point of intersection and at block 608, assessing collision risk to select the at least one pedestrian as a target based on any or a combination of time for vehicle to reach the point of intersection, time for the at least one pedestrian to reach the point of intersection and transition of the at least one pedestrian from one region to another region in field of view of the host vehicle. Further, the method comprises at block 610, generating a deceleration actuation command to decelerate the host vehicle based on the selected target, and providing the deceleration actuation command to an automatic emergency braking (AEB) actuation unit operatively coupled with the host vehicle.

As would be readily appreciated, while primary application for disclosure as elaborated herein is in the automotive domain for pedestrian tracking, it may be used in non-automotive domain as well wherein any moving object may be similarly detected.

As elaborated above, the proposed system incorporates various techniques, which provide various advantages over existing methodologies. For example, the proposed system uses only camera based pedestrian track management. Further, the proposed system performs lateral region classification (high risk region, medium risk region and low risk region) based track management by classifying pedestrian movement into longitudinal movement, lateral movement and stationary pedestrian. Further, pedestrian collision risk assessment is performed based on region classification track management and estimated TTC or time for pedestrian and host vehicle reach the point of intersection around same time. Further more, the proposed system implements closed loop controlled AEB with use of AEB retention, activation distance calculation and AEB release. Also, the proposed system performs pre-filling actuation of the AEB unit prior to generation of the deceleration actuation command.

Those skilled in the art would appreciate that the embodiments of the present disclosure provides track management methodology which enhances the possibility of track maintenance in complex scenarios of crowded city and un-predictable movement of vehicles and pedestrians. The system also manages the track for non-linear and highly maneuvering relative movement of pedestrian w.r.t the host vehicle. The closed loop pedestrian AEB facilitates consistent and smooth performance of AEB control actuation. The system is capable to address lane change and evasive motion of vehicle and abrupt motion of pedestrian.

As used herein, and unless the context dictates otherwise, the term "coupled to" is intended to include both direct coupling (in which two elements that are coupled to each other or in contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While some embodiments of the present disclosure have been illustrated and described, those are completely exemplary in nature. The disclosure is not limited to the embodiments as elaborated herein only and it would be apparent to those skilled in the art that numerous modifications besides those already described are possible without departing from the inventive concepts herein. All such modifications, changes, variations, substitutions, and equivalents are completely within the scope of the present disclosure. The inventive subject matter, therefore, is not to be restricted except in the spirit of the appended claims.

ADVANTAGES OF THE INVENTION

The present disclosure provides a system and method for decelerating a host vehicle based on tracking of a selected or target pedestrian.

The present disclosure provides a system and method for smooth deceleration of a host vehicle based on tracking of pedestrians The present disclosure provides a system and method for decelerating a host vehicle that enhances the possibility of track maintenance in complex scenarios of crowded city.

The present disclosure provides a system and method for decelerating a host vehicle based on tracking of a pedestrian that tracks unpredictable motion of the pedestrian.

The present disclosure provides a system and method for decelerating a host vehicle that manages the track for non-linear and highly maneuvering relative movement of pedestrian with respect to the host vehicle.

The present disclosure provides a system and method for decelerating a host vehicle based on tracking of a pedestrian for consistent and smoother Autonomous Emergency Braking (AEB) in complex scenarios.

The present disclosure provides a system and method that addresses the lane change, evasive motion of the host vehicle and abrupt motion of pedestrian.

The present disclosure provides a robust, economic and simple system and method that accurately tracks pedestrians in front of host vehicle.

We claim:

1. A system implemented in a host vehicle for decelerating said host vehicle based on tracking of at least one pedestrian, said system comprising:
an input unit comprising one or more pre-processors to receive sensed inputs from an image sensor mounted in front of the host vehicle, wherein the image sensor captures field of view of the host vehicle;
a processing unit comprising a processor coupled with a memory, the memory storing instructions executable by the processor to:
receive an input signal comprising one or more parameters of position and velocity of at least one pedestrian in field of view the host vehicle from the input unit, wherein the field of view of the host vehicle is classified into one or more regions;
estimate trajectory of the host vehicle and trajectory of the at least one pedestrian based on one or more factors of position and velocity of the host vehicle and the one or more parameters of position and velocity of the at least one pedestrian to estimate a point of intersection of the host vehicle and the at least one pedestrian;
estimate time to collision based on the estimated point of intersection and determine trajectory of the at least one pedestrian in path of the host vehicle based on any or a combination of the region in the field of view of the host vehicle, estimated trajectories of the host vehicle and the at least one pedestrian and the estimated point of intersection, wherein a history of any or a combination of a yaw rate of the host vehicle, velocity and position of the vehicle, and velocity and position of the at least one pedestrian are considered to determine the trajectory of the at least one pedestrian in path of the host vehicle;
assess collision risk to select the at least one pedestrian as a target based on any or a combination of time for vehicle to reach the point of intersection, time for the at least one pedestrian to reach the point of intersection and transition of the at least one pedestrian from one region to another region in field of view of the host vehicle; and
generate a deceleration actuation command to decelerate the host vehicle based on the selected target, and provide the deceleration actuation command to an automatic emergency braking (AEB) actuation unit operatively coupled with the host vehicle.

2. The system of claim 1, wherein the one or more parameters comprise any or a combination of lateral distance, longitudinal distance, velocity vectors and target status of the at least one pedestrian.

3. The system of claim 1, wherein the one or more regions comprise any or a combination of a high risk region, a medium risk region and a low risk region.

4. The system of claim 1, wherein the processor analyses movement of the at least one pedestrian so that the analysed movement is classified into any or a combination of longitudinal, lateral and stationary.

5. The system of claim 1, wherein the deceleration actuation command is in closed loop control and is regulated continuously when time to collision is less than a predefined threshold value, and wherein the deceleration actuation command is regulated based on feedback of any or a combination of a gap distance between the host vehicle and the estimated point of intersection and the time for the target pedestrian to reach the point of intersection.

6. The system of claim 1, wherein the processor performs pre-filling actuation of the AEB unit prior to generation of the deceleration actuation command.

7. A method for decelerating a host vehicle based on tracking of at least one pedestrian, carried out according to instructions stored in a computer implemented in the host vehicle, comprising:
receiving an input signal comprising one or more parameters of position and velocity of at least one pedestrian in field of view the host vehicle from an input unit, the input unit comprising one or more pre-processors to receive sensed inputs from an image sensor mounted in front of the host vehicle, wherein the image sensor captures field of view of the host vehicle, and wherein the field of view of the host vehicle is classified into one or more regions;
estimating trajectory of the host vehicle and trajectory of the at least one pedestrian based on one or more factors of position and velocity of the host vehicle and the one or more parameters of position and velocity of the at least one pedestrian to estimate a point of intersection of the host vehicle and the at least one pedestrian;
estimating time to collision based on the estimated point of intersection and determine trajectory of the at least one pedestrian in path of the host vehicle based on any or a combination of the region in the field of view of the host vehicle, estimated trajectories of the host vehicle and the at least one pedestrian and the estimated point of intersection, wherein a history of any or a combination of yaw rate of the host vehicle, velocity and position of the vehicle, and velocity and position of the at least one pedestrian are considered to determine the trajectory of the at least one pedestrian in path of the host vehicle;
assessing collision risk to select the at least one pedestrian as a target based on any or a combination of time for vehicle to reach the point of intersection, time for the at least one pedestrian to reach the point of intersection and transition of the at least one pedestrian from one region to another region in field of view of the host vehicle; and
generating a deceleration actuation command to decelerate the host vehicle based on the selected target, and providing the deceleration actuation command to an automatic emergency braking (AEB) actuation unit operatively coupled with the host vehicle.

8. The method of claim 7, wherein the one or more parameters comprise any or a combination of lateral distance, longitudinal distance, velocity vectors and target status of the at least one pedestrian.

9. The method of claim 7, wherein the one or more regions comprise any or a combination of a high risk region, a medium risk region and a low risk region.

10. The method of claim 7, wherein the processor analyses movement of the at least one pedestrian so that the analysed movement is classified into any or a combination of longitudinal, lateral and stationary.

11. The method of claim 7, wherein history of any or a combination of yaw rate of the host vehicle, velocity and position of the vehicle, and velocity and position of the at least one pedestrian are considered to determine the trajectory of the at least one pedestrian in path of the host vehicle.

12. The method of claim 7, wherein the processor performs pre-filling actuation of the AEB unit prior to generation of the deceleration actuation command.

13. A system implemented in a host vehicle for decelerating said host vehicle based on tracking of at least one pedestrian, said system comprising:
- an input unit comprising one or more pre-processors to receive sensed inputs from an image sensor mounted in front of the host vehicle, wherein the image sensor captures field of view of the host vehicle;
- a processing unit comprising a processor coupled with a memory, the memory storing instructions executable by the processor to:
  - receive an input signal comprising one or more parameters of position and velocity of at least one pedestrian in field of view the host vehicle from the input unit, wherein the field of view of the host vehicle is classified into one or more regions;
  - estimate trajectory of the host vehicle and trajectory of the at least one pedestrian based on one or more factors of position and velocity of the host vehicle and the one or more parameters of position and velocity of the at least one pedestrian to estimate a point of intersection of the host vehicle and the at least one pedestrian;
  - estimate time to collision based on the estimated point of intersection and determine trajectory of the at least one pedestrian in path of the host vehicle based on any or a combination of the region in the field of view of the host vehicle, estimated trajectories of the host vehicle and the at least one pedestrian and the estimated point of intersection;
  - assess collision risk to select the at least one pedestrian as a target based on any or a combination of time for vehicle to reach the point of intersection, time for the at least one pedestrian to reach the point of intersection and transition of the at least one pedestrian from one region to another region in field of view of the host vehicle; and
  - generate a deceleration actuation command to decelerate the host vehicle based on the selected target, and provide the deceleration actuation command to an automatic emergency braking (AEB) actuation unit operatively coupled with the host vehicle, wherein the deceleration actuation command is in closed loop control and is regulated continuously when a time to collision is less than a pre-defined threshold value, and wherein the deceleration actuation command is regulated based on feedback of any or a combination of a gap distance between the host vehicle and the estimated point of intersection and the time for the target pedestrian to reach the point of intersection.

14. The system of claim 13, wherein the one or more parameters comprise any or a combination of lateral distance, longitudinal distance, velocity vectors and target status of the at least one pedestrian.

15. The system of claim 13, wherein the one or more regions comprise any or a combination of a high risk region, a medium risk region and a low risk region.

16. The system of claim 13, wherein the processor analyses movement of the at least one pedestrian so that the analysed movement is classified into any or a combination of longitudinal, lateral and stationary.

17. The system of claim 13, wherein history of any or a combination of yaw rate of the host vehicle, velocity and position of the vehicle, and velocity and position of the at least one pedestrian are considered to determine the trajectory of the at least one pedestrian in path of the host vehicle.

18. The system of claim 13, wherein the processor performs pre-filling actuation of the AEB unit prior to generation of the deceleration actuation command.

* * * * *